United States Patent [19]

Brasure

[11] 3,963,672

[45] June 15, 1976

[54] FLAME-RETARDANT POLYVINYL FLUORIDE FILM

[75] Inventor: Donald Eugene Brasure, Tonawanda, N.Y.

[73] Assignee: E. I. Du Pont De Nemours and Company, Wilmington, Del.

[22] Filed: July 16, 1975

[21] Appl. No.: 596,232

[52] U.S. Cl. .................. 260/45.75 B; 260/45.7 R; 264/212; 264/291
[51] Int. Cl.² ........................................... C08J 3/20
[58] Field of Search .............. 260/45.75 B; 264/212, 264/219

[56] References Cited
UNITED STATES PATENTS

| | | | |
|---|---|---|---|
| 3,034,939 | 5/1962 | Newkirk et al. | 260/45.7 R |
| 3,560,441 | 2/1971 | Schwarcz et al. | 260/45.75 B |
| 3,723,139 | 5/1973 | Larkin | 260/45.75 B |
| 3,740,245 | 6/1973 | White et al. | 260/45.75 B |
| 3,892,667 | 7/1975 | Touval | 252/8.1 |

FOREIGN PATENTS OR APPLICATIONS

| | | |
|---|---|---|
| 587,288 | 11/1959 | Canada |
| 1,373,774 | 11/1974 | United Kingdom |

OTHER PUBLICATIONS

Combustion & Flame, June 1966, vol. 10, pp. 135 to 139.

Quick Facts, No. 15, Publication of M & T Chemicals, Rahway, N.J., 1972.

*Primary Examiner*—V.P. Hoke

[57] ABSTRACT

A flame-retardant polyvinyl fluoride film is prepared by incorporating therein sodium, potassium, zinc, magnesium or aluminum antimonate.

5 Claims, No Drawings

FLAME-RETARDANT POLYVINYL FLUORIDE FILM

BACKGROUND OF THE INVENTION

This invention relates to polyvinyl fluoride (PVF) film and, more particularly, relates to a flame-retardant PVF film.

PVF films, and especially biaxially oriented PVF films, are well known in the art as having favorable properties of weather durability, stain resistance, and toughness. These properties have led to the use of PVF films as a protective layer in specialty applications where durability of the surface finish is an important consideration. For instance, PVF film has been used as a wrapping for electrical wire and cable and PVF film bonded to epoxy glass fiber substrate has been used as the finish surface of airplane cabin walls.

Although PVF has a low flame spread rating when compared to most synthetic resin films, such as plasticized PVC films, PVF film can be ignited and will continue to burn when the ignition source is removed. There is a continuing emphasis to improve the burn resistance of materials included in vehicle construction and thus there is a need for a more fire-retardant PVF film.

Antimony trioxide, alone or in combination with various salts, has long been proposed as a fire-retardant additive for synthetic resins such as polyvinyl chloride and polyesters. For instance, U.S. Pat. No. 3,723,139 discloses that an unfused mixture of antimony oxide and certain antimonates is useful as a fire retardant in polyvinyl chloride.

SUMMARY OF THE INVENTION

It has now been found that certain antimonates, alone, are superior fire retardants for polyvinyl fluoride film. Accordingly, the present invention provides a flame-retardant polyvinyl fluoride film containing, as the sole flame-retardant additive, about 3 to 30% by weight of sodium antimonate, potassium antimonate, zinc antimonate, magnesium antimonate, or aluminum antimonate.

DETAILED DESCRIPTION OF THE INVENTION

Polyvinyl fluoride is a well-known synthetic resin which can be prepared as described in U.S. Pat. No. 3,139,207 to James and can be manufactured in oriented film form as described in U.S. Pat. No. 3,139,470 to Prengle and Richards. As used herein, the term "polyvinyl fluoride" includes homopolymers of vinyl fluoride and also embraces copolymers of vinyl fluoride with other monoethylenically unsaturated monomers copolymerizable therewith, wherein vinyl fluoride constitutes at least 75% of the total copolymer weight. Representative monoethylenically unsaturated monomers useful for this purpose include vinyl esters, such as acetate and stearate, acrylates and methacrylates, such as methyl, ethyl butyl and isobutylene methacrylate. Other useful monomers are listed in aforementioned U.S. Pat. No. 3,139,470.

Sodium antimonate, potassium antimonate, zinc antimonate, magnesium antimonate, or aluminum antionate, separately or in combination, can be added to the polyvinyl fluoride to improve the fire-retardant properties thereof in accordance with this invention. Sodium antimonate, however, is particularly effective and is preferred. While as little as 3% by weight will produce beneficial results, it is generally desired that the polyvinyl fluoride film contain at least 7% by weight of the antimonate in order that the film be selfextinguishing when a flame source is removed from the film. Quantities of antimonate in excess of about 30% of total film weight should be avoided since other film properties, such as tenacity and elongation to break, may suffer. In general, amounts in excess of 20% of total film weight are not proportion as effective as smaller amounts. It will be understood that optimum quantities will depend on the specific antimonate selected, on the polyvinyl fluoride composition, and on the presence of other ingredients in the film.

Polyvinyl fluoride film is generally cast from a dispersion in an organic medium, such as dimethylacetamide. The antimonate is conveniently incorporated into the polyvinyl fluoride by addition to the organic dispersion, in the form of an antimonate dispersion or slurry in the same organic medium, prior to coalescing of the polyvinyl fluoride by casing and drying. Alternatively, the antimonate can be dry mixed with the polyvinyl fluoride.

Although the paticle size of the antimonate is not critical, smaller paticle sizes lead to more intimate contact with the polyvinyl fluoride and are thus beneficial. As a general rule, the average particle size should be less than one tenth of the film thickness to minimize the effect of paticles on surface smoothness. Typical final film thicknesses are 0.25 to 5 mils (6 to 150 microns).

In addition to the antimonate, the polyvinyl fluoride film can contain conventional additives such as pigments, fillers and UV absorbers. Among pigments which may be successfully employed are basic zinc chromate, titanium dioxide, iron oxides, phthalocyanine greens and blues, chrome gree, cobalt green, and metal titanates, such as nickel titanate. Useful fillers include silica and calcium carbonate. Typical ultraviolet absorbers which can be used are hydroxybenzophenone and benzotriazole compounds.

The invention will now be further illustrated in the following example, wherein all parts are by weight.

EXAMPLE

A. Specimen Preparation - The polyvinyl fluoride polymer is a homopolymer prepared as described in U.S. Pat. No. 3,139,207. A masterbatch was prepared by dispersing 40 parts of PVF polymer in 60 parts of dimethylacetamide in a blender.

Sample 1 of the Table was prepared by doctoring a portion of the masterbatch dispersion onto a glass support scrim (Burlington Glass Fabrics Company, Style 1659 Greige), pressing the coated scrim at 150°C. for 5 minutes to coalesce the PVF sample, and drying the pressed scrim to 150°C. for 10 minutes to evolve the dimethylacetamide. The resulting scrim-reinforced PVF sample had a thickness of 4 mils (100 microns).

Samples 2 through 9 were prepared by adding the retardant candidates reported in the Table, in dimethylacetamide dispersion, to portions of the masterbatch PVF polymer dispersion using a blender. The resulting dispersions, containing 60 parts of dimethylacetamide and 40 parts of PVF plus retardant, were doctored onto scrims, pressed, and dried as described with respect to Sample 1.

Test specimens were made of each sample by cutting 1 inch × 6 inch (25 mm. × 154 mm.) swatches, and then making a ⅝ inch × ½ inch (16 mm. ×12.7 mm.)

cutout centered at one end of each swatch, leaving two 3/16 inch × ½ inch (9.5 mm. ×12.7 mm.) outer legs.

B. Test Apparatus - A metal cabinet is employed having the structure described in Federal Spec. CCC-T-191b Method 5902, May 15, 1951, Flame Resistance of Cloth; Vertical, except that an adjustable sample rack is employed to permit testing of the specimens at prescribed angles (25°, 35°, 50°) from horizontal. The sample rack consists of two upright rods mounted to the cabinet. Each rod is fitted with an adjustable specimen clamp.

C. Specimen Testing - In turn, the legs of each specimen were placed in one clamp with ½ inch (12.7 mm.) held in the clamp. A line was drawn across the specimen ½ inch (12.7 mm.) from the other end, i.e., 5 inches (127 mm.) from the cutout, and the marked end was placed in the other clamp, ¼ inch (6.4 mm.) being held in the clamp. Height of the two clamps was then adjusted to put the test specimen at the prescribed angle from horizontal (25°, 35°, or 50°).

The gas adjusting valve of a Bunsen burner having a ⅜ inch (9.5 mm.) inside diameter tube was adjusted to provide a flame 1½ inches (38.1 mm.) in height with the tube vertical and the burner air inlet closed. The flame was brought into contact with the specimen such that the cut end was in the center of the flame. After being held in that position for 12 seconds, the flame was removed.

Burn time was measured from the time the flame contacted the specimen to the time at which the specimen burned to the 5-inch (127-mm.) line or to the time at which the flame extinguished. Burn length was measured from the edge of actual flame contact to the furthest edge of burn. Burn rate was then calculated as cm./sec. and recorded as shown in the Table for the various specimens.

The tubulated data shows that specimens containing sodium antimonate far surpassed the other specimens in flame retardance.

TABLE

| Sample | Candidate Retardant | % Retardant in Sample, by Weight | Burn Rate (cm./sec.) | | |
|---|---|---|---|---|---|
| | | | 25° from Horizontal | 35° from Horizontal | 50° from Horizontal |
| 1 | None | — | .7[a] | .8[a] | — |
| 2 | Calcium Carbonate, CARBIUM (Diamond Alkali Co.) | 7.5 | .6[a] | — | — |
| 3 | Calcium Carbonate | 15 | .7[a] | — | — |
| 4 | Sodium Carbonate, anhydrous (Fisher Scientific Co.) | 7.5 | .8[a] | .8[a] | — |
| 5 | Antimony Oxide, Fireshield OA-H (Chemtron Corp.) | 7.5 | .4[a] | .4hu (a) | .7[a] |
| 6 | Antimony Oxide | 15 | .2[b] | .4[a] | .8[b] |
| 7 | Antimony Oxide/Sodium Carbonate, as identified above | 7.5/7.5 | .3[b] | .2[b] | — |
| 8 | Sodium Antimonate, 0.2% retained on 200-mesh screen (M & T Chemicals, Inc.) | 7.5 | 0 | 0 | 0 |
| 9 | Sodium Antimonate | 15 | 0 | 0 | 0 |

[a] Burned entire 5-inch (217-mm.) sample.
[b] Flame went out before 5 inches (127 mm.) burned.

I claim:

1. A flame-retardant polyvinyl fluoride flim containing, as the sole flame-retardant additive, about 3 to 30% by weight of at least one sodium antimonate, potassium antimonate, zinc antimonate, magnesium antimonate, or aluminum antimonate.

2. The film of claim 1 containing about 7 to 20% by weight sodium antimonate.

3. The film of claim 2 having a burn rate of zero cm./sec. when tested at 25° from horizontal.

4. The film of claim 2 wherein the film is biaxially oriented.

5. The film of claim 2 wherein the film is cast or impregnated on a supporting substrate.

* * * * *

UNITED STATES PATENT OFFICE
CERTIFICATE OF CORRECTION

PATENT NO. : 3,963,672
DATED : June 15, 1976
INVENTOR(S) : Donald Eugene Brasure It is certified that error appears in the above-identified patent and that said Letters Patent are hereby corrected as shown below:

Column 1, line 48; "3,139,207" should read -- 3,129,207 --.

Column 4, line 34; "flim" should read -- film --.

Signed and Sealed this

Seventh Day of September 1976

[SEAL]

Attest:

RUTH C. MASON
*Attesting Officer*

C. MARSHALL DANN
*Commissioner of Patents and Trademarks*